United States Patent [19]
Vegara

[11] Patent Number: 5,560,219
[45] Date of Patent: Oct. 1, 1996

[54] MOBILE CAMPER COMPARTMENT COOLER

[76] Inventor: Joey Vegara, 1211 E. Beech St., Roswell, N.M. 88201

[21] Appl. No.: 439,496

[22] Filed: May 11, 1995

[51] Int. Cl.⁶ .............. B60H 1/32; B60P 3/20; F25D 3/02
[52] U.S. Cl. .............. 62/241; 62/245; 62/312
[58] Field of Search .............. 62/304, 312, 313, 62/61, 91, 239, 241, 244, 245

[56] References Cited

U.S. PATENT DOCUMENTS

| | | | |
|---|---|---|---|
| D. 254,905 | 5/1980 | Collins | D12/156 |
| 2,453,295 | 11/1948 | Battley et al. | 62/245 |
| 2,557,004 | 6/1951 | Lepper | 62/245 |
| 2,966,046 | 12/1960 | Wright | 62/312 |
| 2,998,714 | 9/1961 | Bonzer | 62/312 |
| 3,529,435 | 9/1970 | Becker | 62/244 |
| 3,606,982 | 9/1971 | Anderson | 62/241 |
| 3,738,621 | 6/1973 | Anderson | 261/29 |
| 3,961,496 | 6/1976 | Ku | 62/459 |
| 4,335,916 | 6/1982 | Gutgsell | 296/100 |
| 4,927,206 | 5/1990 | Murdock | 296/156 |
| 4,932,717 | 6/1990 | Swann | 296/216 |
| 4,943,108 | 7/1990 | Turnbull | 296/100 |
| 5,146,757 | 9/1992 | Dearing | 62/61 |
| 5,168,722 | 12/1992 | Brock | 62/304 |
| 5,197,301 | 3/1993 | Holcomb | 62/457.1 |
| 5,285,654 | 2/1994 | Ferdows | 62/309 |

*Primary Examiner*—William Doerrler
*Attorney, Agent, or Firm*—John D. Gugliotta

[57] ABSTRACT

A camper cooling device is disclosed for a camper in the bed of a pickup truck comprising a holding tank, an intake grill, cooler pads, a plurality of adjustable vents, a maintenance door, and an overflow and drain tube. In accordance with a preferred embodiment, the camper owner first inserts ice into the rear of the holding tank located on the top of the camper. This insertion of ice can be accomplished by standing on the rear bumper, tailgate, or ladder. When the camper is mobile, air flows through the intake grill and over the cooler pads located at the front of the system. The ice cools the incoming air. Vents situated inside the camper compartment direct cold air circulation within the camper. An overflow and drain tube is positioned in the rear of the system to drain excess water.

8 Claims, 2 Drawing Sheets

MOBILE CAMPER COMPARTMENT COOLER

BACKGROUND OF THE INVENTION

1. Field of the Invention

The present invention relates generally to mobile campers of the type typically carried in the bed of a pick-up truck, and, more particularly, to a cooling system which is designed to cool such a camper without any chemicals or motors.

2. Description of the Related Art

In the related art, many types of pick-up truck campers as well as pick-up truck bed caps are known. For example, the following are known which disclose a variety of such related art:

U.S. Pat. No. 4,943,108 issued in the name of Turnbull;

U.S. Pat. No. 4,932,717 issued in the name of Swann;

U.S. Pat. No. 4,927,206 issued in the name of Murdock;

U.S. Pat. No. 4,335,916 issued in the name of Gutgsell; and

U.S. Design Pat. No. 254,905 issued in the name of Collins.

And, although all of these references disclose manners of sheltering pick-up truck beds, none of this related art discloses a method of cooling the compartment formed by a pick-up truck bed and a cap or cover.

Numerous attempts have been made to cool an interior compartment of an automobile. Conventional methods utilizing refrigerants and air conditioners are widely known. Also, several methods of cooling an automobile compartment without refrigerants are known. For instance, U.S. Pat. No. 3,931,796, issued in the name of Ku, discloses a portable air conditioner which utilizes ice as a cooling medium. However, a portable air conditioner made in accordance with this reference is associated with several drawbacks. For example, motors are required to intake and discharge air. Moreover, pumps appear to be necessary in order to circulate water over the heat transfer fins.

Additionally, U.S. Pat. No. 5,197,301, issued in the name of Holcomb, discloses an ice cooled air conditioner and method. As disclosed in the Holcomb reference, once again at least one fan is required in order to circulate air through an air cooling duct and out an air exit port.

And finally, in U.S. Pat. No. 3,529,435 issued in the name of Becker, an air cooler for automobile is disclosed. According to the Becker reference, air is forced across a cooler containing frozen carbon dioxide, or dry ice. Aside from the problems of the availability of dry ice and the need for a circulating fan, such a disclosure poses the obvious hazards associated with allowing a source of gaseous carbon dioxide within a closed compartment such as that of an automobile or even a camper compartment.

Consequently, a need has been felt for providing an apparatus and method which overcomes the problems and discomforts associated with allowing the air in a living compartment of a camper to remain heated, but at the same time not involving complex, motorized equipment that requires constant electrical energy and utilized complex moving parts.

SUMMARY OF THE INVENTION

It is therefore an object of the present invention to provide an improved camper cooling device and method.

It is another object of the present invention to provide a camper cooling device that eliminates the use of chemical refrigerants and complex motors.

It is a feature of the present invention to provide an improved camper cooling device that uses wind generated from travelling or from natural convection to assist in the cooling of the camper quarters.

Briefly described according to one embodiment of the present invention, a camper cooling device is disclosed providing a camper comprising a holding tank, an intake grill, a plurality of cooler pads, a plurality of adjustable vents, a. maintenance door, and an overflow and drain tube.

In accordance with a preferred embodiment, the camper owner first inserts ice through an access door into the rear of the holding tank located on the top of the camper. This insertion of ice can be accomplished by standing on the rear bumper, tailgate, or ladder. When the camper is mobile, air flows through the intake grill located at the front of the system and over the cooler pads. The ice cools the incoming air. When the camper is stationary, convection will cause the cold air to flow downward into the camper compartment in a silent manner without the need of fans or electrical energy. Vents situated inside the camper compartment direct cold air circulation within the camper. An overflow and drain tube is positioned in the rear of the system to drain excess water.

An advantage of the present invention is that it maintains a comfortable temperature inside a camper without the use of motors or refrigerants.

Another advantage of the present invention is that it maintains a comfortable temperature inside a camper in a quiet, noise free manner.

Other advantages of the present invention is that there are no moving parts that can break and requires very little maintenance.

Further, a preferred embodiment of the present invention has an ice holding tank that can also be used to keep soft drinks cold, and the water formed can also be used to wash utensils, plates, hands, etc.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures.

Figure 1:
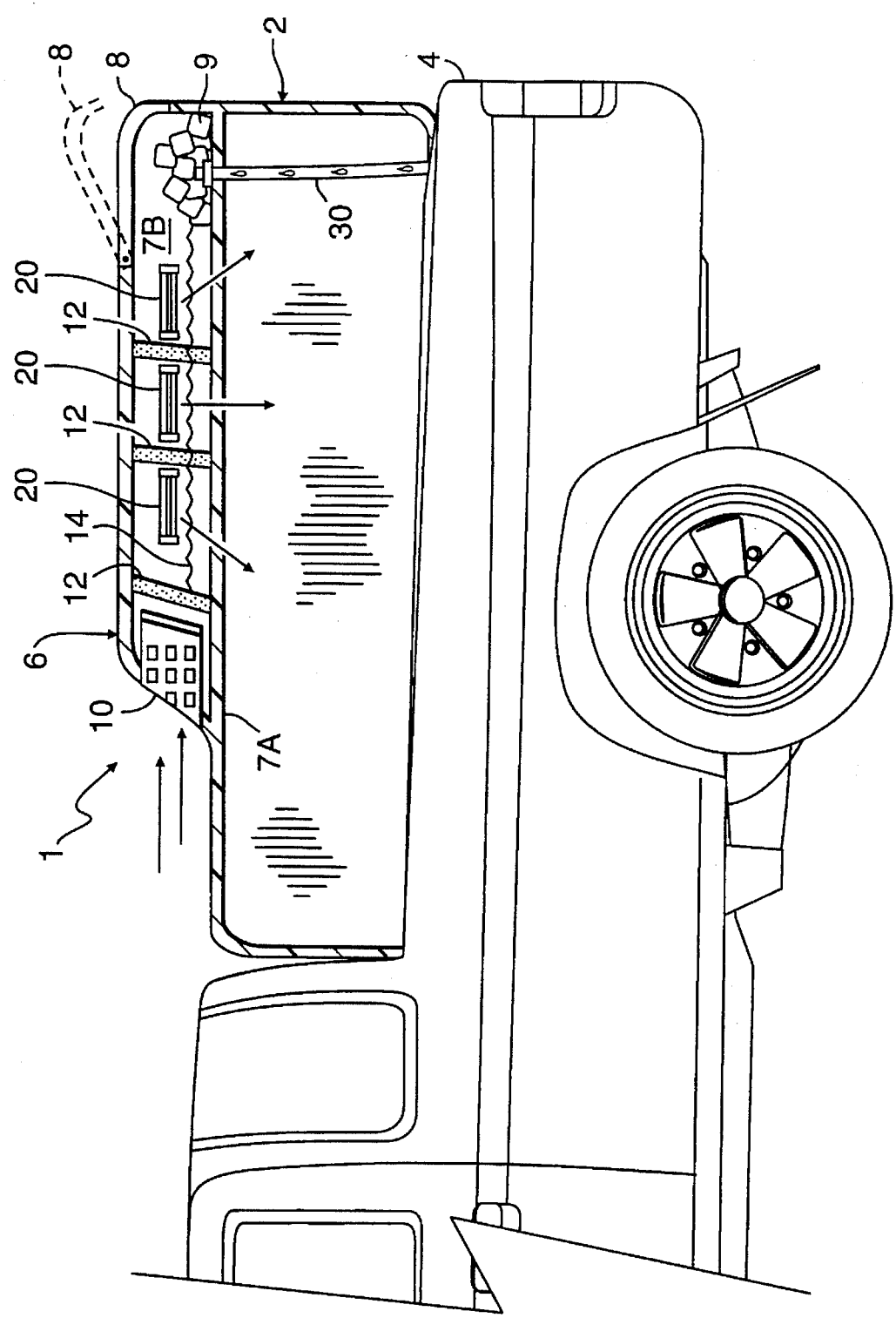
FIG. 1 is a side view of a camper cooler according to a preferred embodiment of the present invention.

Referring now to FIG. 1, a camper cooler system 1 is shown, according to the present invention, forming a camper compartment 2 in the bed area of a pickup truck 4. A holding tank 6 is formed above the camper compartment 2. According to the preferred embodiment of the present invention, it is envisioned that a horizontal floor 7A and a pair of generally vertical sidewalls 7B are common to both the holding tank 6 as well as the camper compartment 2. The holding tank 6 also has an access door 8 at the rear of the camper cooler apparatus 1. Ice 9 is loaded into the holding tank 6 via this access door 8, and provides the cooling medium. An outside intake grill 10 is mounted at the front of the camper cooler apparatus 1 and allows air to pass into the holding tank 6 when the pickup truck 4 is in motion or when a breeze is present. It is currently envisioned that the outside intake grill 10 is comprised of a fine enough mesh screen to prevent stones, bugs, or other particulates from entering the holding tank 6, yet still allowing free airflow into the holding tank 6. A series of inside cooler pads 12 are provided within the holding tank 6. These inside cooler pads 12 absorb icewater 14 that results upon melting of the ice 9 within the holding tank 6. By absorbing the icewater 14 in a wicking-like manner, these inside cooler pads 12 remove heat via evaporative cooling when air passes over them. The inside cooler pads 12 also provide the function of preventing the ice 9 from shifting dramatically during vehicle movement as well as preventing the icewater 14 from sloshing about within the holding tank 6. It is currently envisioned that an inside cooler pad comprised of a straw mesh pad would adequately provide this functionality. According to a preferred embodiment of the present invention, the generally vertical sidewalls 7B are shared with both the holding tank 6 and camper compartment 2, and have a series of vents 20 which provide fluid communication between the interior of the holding tank 6 and the interior of the camper compartment 2. Finally, an overflow and drain tube 30 is provided in fluid communication between the holding tank 6 and the exterior of the camper cooler apparatus 1 in order to prevent fluid overflow from the holding tank 6 through the vents 20 into the camper compartment 2.

Figure 2:
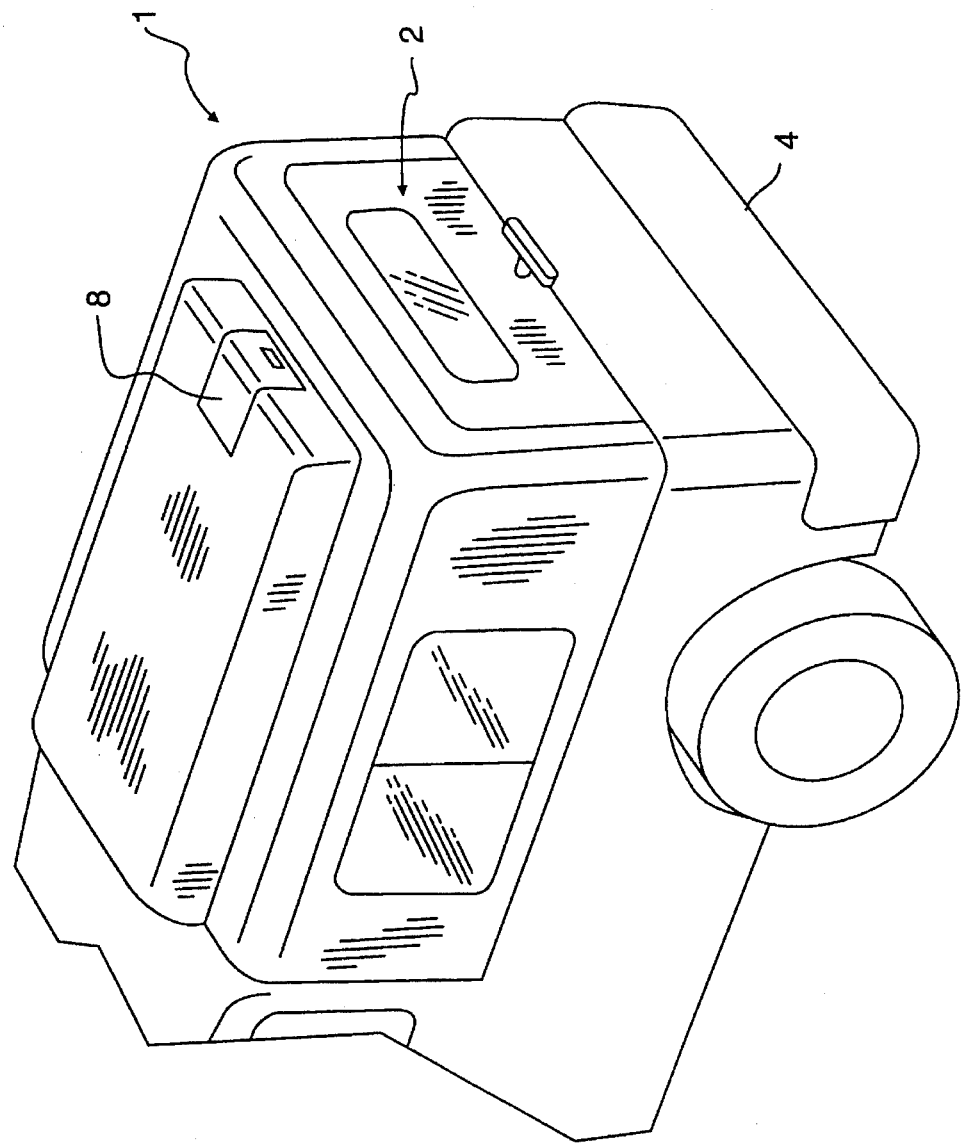
FIG. 2 is an orthographic view of a camper cooler according to the preferred embodiment of the present invention.

Referring to FIG. 2, the camper cooler apparatus 1 is shown, with greater detail shown of the camper compartment 2 and the access door 8.

2. Operation of the Preferred Embodiment

In operation, the present invention is simple to use and has no moving parts. To use the present invention, the user simply adds ice 9 into the holding tank 6 via the access door 8. While driving, air is forced into the holding tank 6 through the outside intake grill 10. A user inside the camper compartment 2 will simply adjust the vents 20 to regulate the flow of cold air into the camper compartment 2. As the air is cooled, the ice 9 is melted, becoming cold icewater 14. The icewater 14 is wicked into the inside cooler pads 12, and provides another source to remove sensible heat from the air. As the ice 9 melts, there may come a point where the level of icewater 14 rises higher than desired. To prevent this, the overflow and drain tube is 30 provides a means of removing excess icewater 14 from the holding tank 2, discharging it external to the vehicle.

The foregoing description is included to illustrate the operation of the preferred embodiment and is not meant to limit the scope of the invention. Many variations will be apparent to those skilled in the art that would yet be encompassed by the spirit and scope of the invention. Therefore, the scope of the invention is to be limited only by the following claims.

What is claimed is:

1. A mobile camper compartment cooler for use with a camper, said cooler comprising:

a holding tank, said holding tank having a horizontal floor and a plurality of generally vertical sidewalls;

a closeable maintenance door accessing said holding tank:

air intake means for focusing airflow into said holding tank, wherein said air intake means for focusing airflow into said holding tank comprises a reinforced mesh grill, said grill mounted at the front of said camper compartment cooler:

a plurality of cooler pads, said cooler pads functioning to increase the surface area available for air to contact water within said holding tank, and said cooler pads also functioning to prevent the shifting of the contents of said holding tank during camper movement;

air vent means for venting chilled air from said holding tank into said camper compartment; and a drain tube in fluid communication between said holding tank and the exterior of said camper compartment.

2. A mobile camper compartment cooler for use with a camper, said cooler comprising:

a holding tank, said holding tank having a horizontal floor and a plurality of generally vertical sidewalls;

a closeable maintenance door accessing said holding tank:

air intake means for focusing airflow into said holding tank;

a plurality of cooler pads, said cooler pads functioning to increase the surface area available for air to contact water within said holding tank, and said cooler pads also functioning to prevent the shifting of the contents of said holding tank during camper movement;

air vent means for venting chilled air from said holding tank into said camper compartment, wherein said air vent means for venting chilled air from said holding tank into said camper compartment comprises a plurality of directable distribution vents mounted within and penetrating said generally vertical sidewalls of said holding tank such as to provide fluid communication among and permit the flow of air between said holding tank and said camper compartment; and a drain tube in fluid communication between said holding tank and the exterior of said camper compartment.

3. A mobile camper compartment cooler for use with a camper, said cooler comprising:

a holding tank, said holding tank having a horizontal floor and a plurality of generally vertical sidewalls;

a closeable maintenance door accessing said holding tank;

air intake means for focusing airflow into said holding tanks;

a plurality of cooler pads, said cooler pads functioning to increase the surface area available for air to contact water within said holding tank, and said cooler pads also functioning to prevent the shifting of the contents of said holding tank during camper movement;

air vent means for venting chilled air from said holding tank into said camper compartment; and a drain tube in fluid communication between said holding tank and the exterior of said camper compartment, wherein said drain tube comprises:

an overflow nozzle, said nozzle penetrating said horizontal floor of said holding tank, and said nozzle adjustably protruding above said horizontal floor;

a nozzle connection coupling, said nozzle connection coupling rigidly holding said overflow nozzle to said horizontal floor in a water-tight manner; and a generally elongated, flexible conduit connected to said overflow nozzle and having a discharge orifice, said conduit for communicating water from said holding tank to the exterior of the camper compartment out of said discharge orifice.

4. A mobile camper compartment cooler comprising:

a camper compartment housing, said compartment housing comprising a ceiling and a pair of sidewalls adapted to fit within and cover a truck bed of a pickup truck and forming a camper compartment within said truck bed of said pickup truck;

a holding tank incorporated within and above said ceiling of said camper compartment housing, said holding tank having a horizontal floor and a plurality of generally vertical sidewalls;

a closeable maintenance door accessing said holding tank;

air intake means for focusing airflow into said holding tank wherein said air intake means for focusing airflow into said holding tank comprises a reinforced mesh grill, said grill mounted at the front of said camper compartment cooler;

plurality of porous partitioning means to prevent the shifting of any solid contents of said holding tank during while freely allowing the passage within said holding tank of any fluid or vapor within said holding tank;

air vent means for venting chilled air from said holding tank into said camper compartment; and a drain tube in fluid communication between said holding tank and the exterior of said camper compartment said drain tube having an upper opening and a lower opening.

5. A mobile camper compartment cooler comprising:

a camper compartment housing, said compartment housing comprising a ceiling and a pair of sidewalls adapted to fit within and cover a truck bed of a pickup truck and forming a camper compartment within said truck bed of said pickup truck;

a holding tank incorporated within and above said ceiling of said camper compartment housing, said holding tank having a horizontal floor and a plurality of generally vertical sidewalls;

a closeable maintenance door accessing said holding tank;

air intake means for focusing airflow into said holding tank;

plurality of porous partitioning means to prevent the shifting of any solid contents of said holding tank during while freely allowing the passage within said holding tank of any fluid or vapor within said holding tank;

air vent means for venting chilled air from said holding tank into said camper compartment wherein said air vent means for venting chilled air from said holding tank into said camper compartment comprises a plurality of directable distribution vents mounted within and penetrating said generally vertical sidewalls of said holding tank such as to provide fluid communication among and permit the flow of air between said holding tank and said camper compartment; and a drain tube in fluid communication between said holding tank and the exterior of said camper compartment, said drain tube having an upper opening and a lower opening.

6. In a mobile camper compartment housing comprising a ceiling and a plurality of sidewalls adapted to fit within and cover a truck bed of a pickup truck and forming a camper compartment within said truck bed of said pickup truck, wherein the improvement comprises:

a holding tank incorporated within and above said ceiling of said camper compartment housing, said holding tank having a horizontal floor, a closeable access door, and a plurality of generally vertical sidewalls;

a closeable maintenance door accessing said holding tank;

air intake means for focusing airflow into said holding tank wherein said air intake means for focusing airflow into said holding tank comprises a reinforced mesh grill, said grill mounted at the front of said camper compartment cooler;

plurality of porous partitioning means for preventing the shifting of any solid contents of said holding tank during while freely allowing the passage within said holding tank of any fluid or vapor within said holding tank;

air vent means for venting chilled air from said holding tank into said camper compartment; and a drain tube in fluid communication between said holding tank and the exterior of said camper compartment, said drain tube having an upper opening and a lower opening.

7. In a mobile camper compartment housing comprising a ceiling and a plurality of sidewalls adapted to fit within and cover a truck bed of a pickup truck and forming a camper compartment within said truck bed of said pickup truck, wherein the improvement comprises:

a holding tank incorporated within and above said ceiling of said camper compartment housing, said holding tank having a horizontal floor, a closeable access door, and a plurality of generally vertical sidewalls;

a closeable maintenance door accessing said holding tank;

air intake means for focusing airflow into said holding tank;

plurality of porous partitioning means for preventing the shifting of any solid contents of said holding tank during while freely allowing the passage within said holding tank of any fluid or vapor within said holding tank;

air vent means for venting chilled air from said holding tank into said camper compartment, wherein said air vent means for venting chilled air from said holding tank into said camper compartment comprises a plurality of directable distribution vents mounted within and penetrating said generally vertical sidewalls of said holding tank such as to provide fluid communication among and permit the flow of air between said holding tank and said camper compartment; and a drain tube in fluid communication between said holding tank and the exterior of said camper compartment, said drain tube having an upper opening and a lower opening.

8. In a mobile camper compartment housing comprising a ceiling and a plurality of sidewalls adapted to fit within and cover a truck bed of a pickup truck and forming a camper compartment within said truck bed of said pickup truck, wherein the improvement comprises:

a holding tank incorporated within and above said ceiling of said camper compartment housing, said holding tank having a horizontal floor, a closeable access door, and a plurality of generally vertical sidewalls;

a closeable maintenance door accessing said holding tank;

air intake means for focusing airflow into said holding tank;

plurality of porous partitioning means for preventing the shifting of any solid contents of said holding tank during while freely allowing the passage within said holding tank of any fluid or vapor within said holding tank;

air vent means for venting chilled air from said holding tank into said camper compartment; and a drain tube in fluid communication between said holding tank and the exterior of said camper compartment, said drain tube having an upper opening and a lower opening, and wherein said drain tube comprises:

an overflow nozzle, said nozzle penetrating said horizontal floor of said holding tank, and said nozzle adjustably protruding above said horizontal floor;

a nozzle connection coupling, said nozzle connection coupling rigidly holding said overflow nozzle to said horizontal floor in a water-tight manner; and a generally elongated, flexible conduit connected to said overflow nozzle and having a discharge orifice, said conduit for communicating water from said holding tank to the exterior of the camper compartment out of said discharge orifice.

* * * * *